George E. Rust.
Improvement in Horse Shoe Cushions.
73050
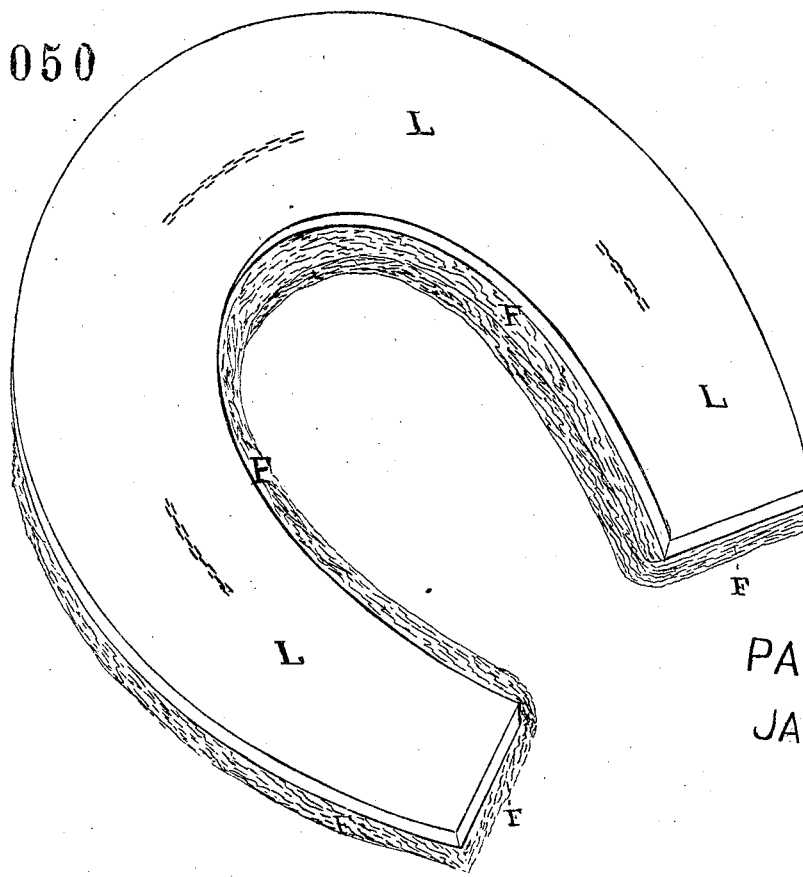
Fig. I.
PATENTED
JAN 7 1868
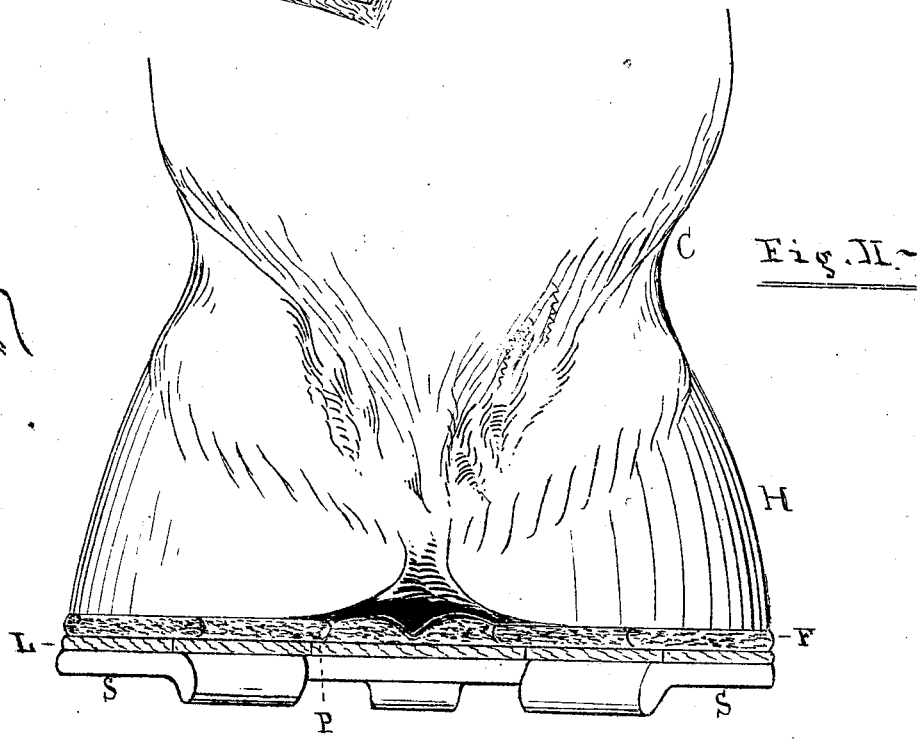
Fig. II.

United States Patent Office.

GEORGE E. RUST, OF BOSTON, MASSACHUSETTS.

Letters Patent No. 73,050, dated January 7, 1868.

IMPROVED HORSE-SHOE CUSHION.

The Schedule referred to in these Letters Patent and making part of the same.

TO ALL WHOM IT MAY CONCERN:

Be it known that I, GEORGE E. RUST, of Boston, in the county of Suffolk, and State of Massachusetts, have invented a new and useful Improvement in "Horse-Shoe Cushions;" and I do hereby declare that the following is a full and exact description of the same, reference being had to the accompanying drawings, making a part of this specification.

Figure I is a perspective view.

Figure II is a vertical section on the line A B, Fig. I.

My improved cushion is intended for use between the hoof of the horse and the shoe, for the purpose of diminishing the force of concussion, preventing the entrance of gravel and dirt between the hoof and shoe, relieving and equalizing the pressure on corns or quarter-cracks, and for retaining a slight amount of moisture, sufficient to keep the hoof in good condition.

The cushion is constructed as represented in Figs. I and II, being made in two parts, L and F, placed in contact with each other. One of the parts, L, is made of leather, and the other part, F, of felt, porous cloth, or other fibrous substance. The relative position of the parts is shown in Fig. II: C, the fetlock; H, the hoof; F, the felt in contact with the hoof; L, the leather; and S, the iron shoe.

The leather is of the same breadth and curvature as the shoe, and may be about one-sixteenth or one-eighth of an inch in thickness. The felt is of the same form, and projects inward, forming a narrow ledge, as at F, thus presenting an enlarged surface for the absorption of moisture.

The leather is designed to assist in keeping the felt in place, and also to receive the main part of the wear or friction at the upper surface of the shoe. The felt is about one-eighth of an inch in thickness, but, if it is desirable that the hoof be kept very moist, its thickness may be increased. In certain diseases of the hoof, the felt may also be made thicker, in order that it may adapt itself to any curves or projections of the hoof, thus equalizing the pressure, making the shoe less rigid, and reducing the shock or concussion when the shoe strikes the ground or pavement.

The leather and the felt may be pasted or stitched together; but this is not necessary, as the nails that secure the shoe to the hoof will hold them in place, being driven in the usual manner, and passing through the cushion.

What I claim, and desire to secure by Letters Patent, is—

The double pad or cushion, composed of leather and felt or other fibrous cloth, and interposed between the hoof of the horse and the shoe, substantially as herein described.

GEORGE E. RUST. [L. S.]

Witnesses:
　JOHN M. BATCHELDER,
　EBEN T. GRAY.